United States
Jorgensen

[11] 3,877,016
[5] Apr. 8, 1975

[54] DRIVER CIRCUIT FOR LIQUID CRYSTAL DISPLAY

[75] Inventor: Arnold J. Jorgensen, San Jose, Calif.

[73] Assignee: Omron R & D, Inc., Mountain View, Calif.

[22] Filed: Oct. 4, 1973

[21] Appl. No.: 403,504

[52] U.S. Cl. ........ 340/336; 315/169 R; 350/160 LC
[51] Int. Cl. .............................................. G08b 5/36
[58] Field of Search ..................................... 340/336

[56] References Cited
UNITED STATES PATENTS
3,653,745  4/1972  Mao.............................. 350/160 LC
3,750,140  7/1973  Gray ..................................... 340/336
3,789,388  1/1974  Medwin ............................. 340/336

Primary Examiner—David L. Trafton
Attorney, Agent, or Firm—Flehr, Hohbach, Test, Albritton & Herbert

[57] ABSTRACT

A circuit for driving liquid crystal displays in which numerals or symbols are made up of a plurality of segments in which one terminal of like segments of each of a plurality of numerals or symbols are simultaneously energized with an a.c. voltage from a plurality of segment circuits which energize selected segments and in which the other terminals of all of the segments of each numeral or symbol are energized with an a.c. voltage from a plurality of digit circuits which energize selected numerals or symbols whereby the selected segments of selected digits display responsive to simultaneous application of a.c. voltages to the one and the other terminal.

4 Claims, 4 Drawing Figures

3,877,016

DRIVER CIRCUIT FOR LIQUID CRYSTAL DISPLAY

BACKGROUND OF THE INVENTION

This invention relates generally to a driver circuit for liquid crystal displays and more particularly to a multiplexed a.c. driver circuit.

Liquid crystal displays include a plurality of segments, generally seven per digit, which are selectively energized to display a number of symbol. Prior art driver circuits for liquid displays have included driver means for individually applying continuous power to each segment of each numeral or symbol with the application of power controlled to energize selected segments. This makes the driver circuitry for a liquid crystal relatively expensive because of the large number of drivers required to provide a display having adequate display segments.

OBJECTS AND SUMMARY OF THE INVENTION

It is a general object of the present invention to provide an improved driver circuit for displays and more particularly for liquid crystal displays.

It is another object of the present invention to provide an a.c. multiplex driver circuit for the display segments of a multiple segment display.

It is another object of the present invention to provide a multiplex driver circuit for liquid crystal displays in which the segments of each display numeral are periodically energized.

The foregoing and other objects of the invention are achieved by employing a driver circuit which includes a d.c. voltage source, an a.c. voltage source, a source of segment select pulses and a plurality of segment voltage control means, one for each segment of a numeral or symbol, one segment voltage control means is connected to each of the first terminals of like segments of a plurality of display numbers or symbols for controlling application of voltage from said source to said first terminals of like segments responsive to a segment select signal and the voltage from said a.c. voltage source to selectively apply a portion of said d.c. voltage to said terminals, said control means being responsive to absence of segment select pulses to apply only a portion of said d.c. voltage to said first terminal of each of said like segments and a second a.c. voltage source having a 180° phase relationship to said first a.c. voltage source, a source of numeral or symbol select pulses and a plurality of digit voltage control means one for each numeral or symbol, one digit voltage control means connected to the second terminals of all segments of each of said numeral or symbol for controlling application of voltage from said source to said terminals responsive to a digit select pulse and to said a.c. voltage source to alternately apply said d.c. voltage to said plurality of second terminals, and means responsive to the absence of digit select pulses to apply only a portion of the d.c. voltage to said segments whereby when the first and second terminals of a segment both have alternating d.c. voltage applied, the segments are energized and said segments are not energized when the alternating d.c. voltage is applied only to one or the other terminal, or not at all.

DESCRIPTION OF PREFERRED EMBODIMENT

Figure 1:
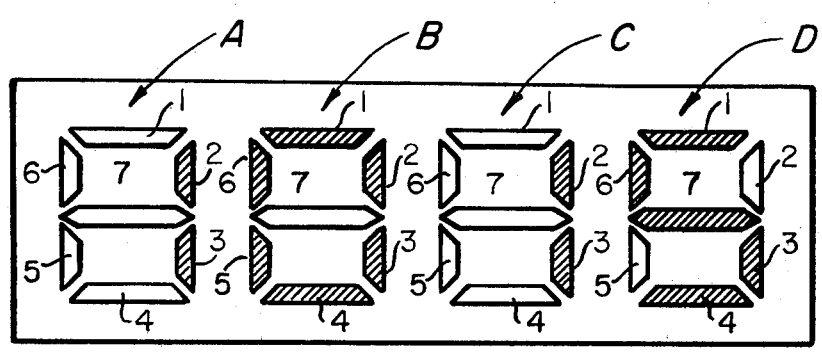
FIG. 1 schematically shows a four numeral display, such as a liquid crystal display, each numeral including seven segments which are selectively energized to display selected numbers.

FIG. 1 shows a plan view of a liquid crystal display suitable for electronic watches, calculators and the like including four numerals or symbols A, B, C and D. It is understood that the present invention can be applied to displays including a larger number of numerals. The numerals each include seven segments designated 1, 2, 3, 4, 5, 6 and 7. In the description to follow, the segments are identified by the letter S with the particular segment identified by a number subscript corresponding to the segment followed by a letter subscript which identifies the numeral. Thus, for example, referring to the Figure, the energized segments, which are shown in black, would be identified as: $S_{2A}$ and $S_{3A}$ for the first number; $S_{1B}$, $S_{2B}$, $S_{3B}$, $S_{4B}$, $S_{5B}$ and $S_{6B}$ for the second number; $S_{2C}$ and $S_{3C}$ for the third number; and $S_{1D}$, $S_{3D}$, $S_{4D}$, $S_{6D}$ and $S_{7D}$ for the fourth number. As is well known, each of the segments includes a first and a second terminal between which a voltage can be applied to cause the segment to indicate.

Figure 2:
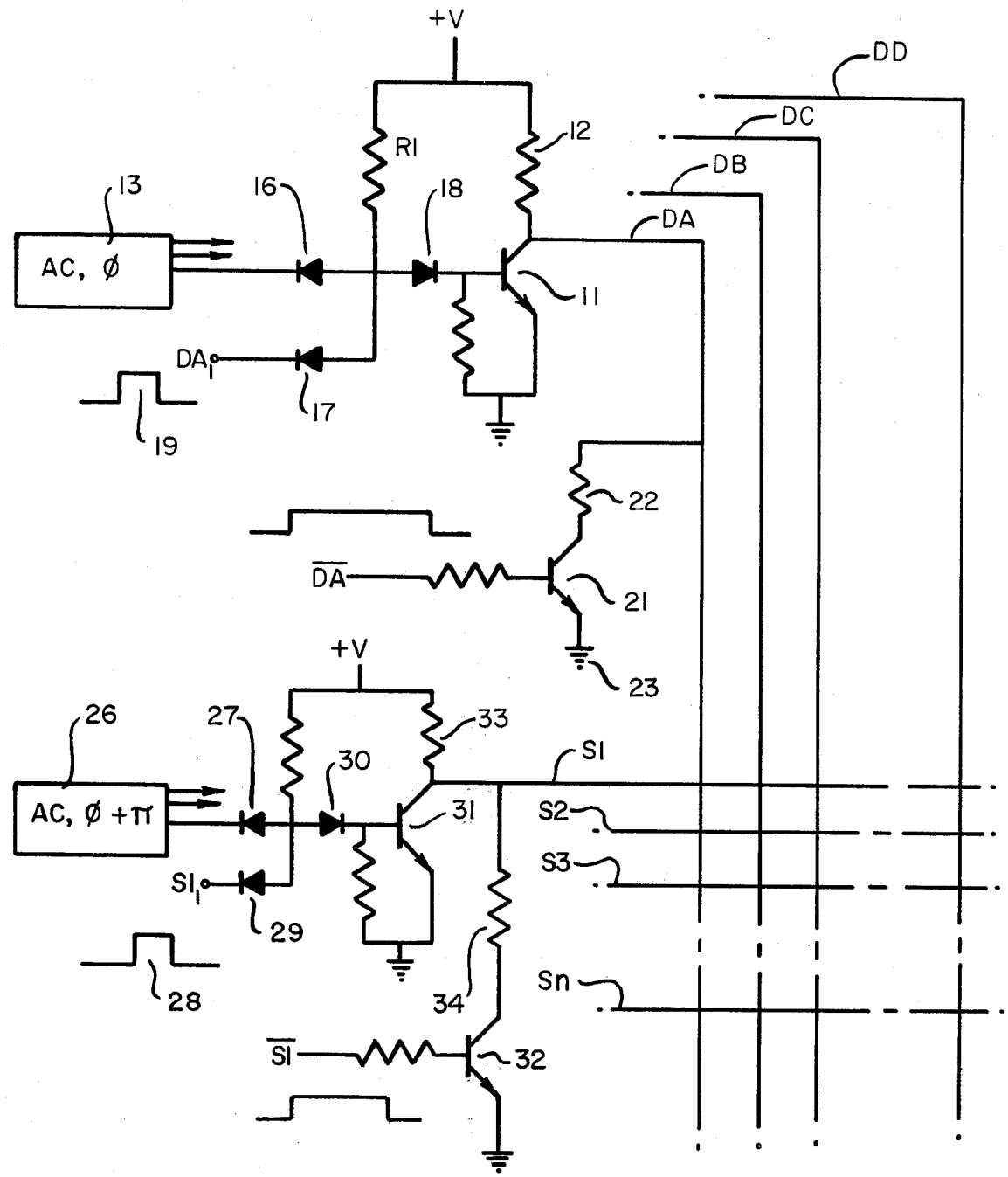
FIG. 2 is a circuit diagram of a suitable multiplex a.c. driver circuit in accordance with the invention.

A driver circuit for applying suitable voltages to the first and second terminal of each of the segments is shown in FIG. 2. All of the second terminals of every segment of each of the numerals A, B, C and D are connected to a digit line DA, DB, DC and DD. Thus, when a voltage is applied to the digit line DA, the voltage is applied to the second terminal of every segment in the numeral A. The voltage is applied from d.c. voltage sources +V by the switching transistor 11. When the transistor is turned off, the full voltage +V is applied to the digit line DA, whereas when the transistor is fully conducting, the voltge drops across the resistor 12 and the line DA is essentially grounded. In accordance with the present invention, the base of the transistor 11 is driven by an a.c. voltage which serves to alternately turn on and off the transistor 11. The a.c. voltage having a predetermined phase is derived from an a.c. signal source 13. The output of the a.c. source 13 is connected through diodes 16 and 18 to the base of transistor 11. A digit select signal in the form of a voltage pulse 19 is applied to the diode 17. When pulse 19 is present at the diode 17, as shown at terminal $DA_1$, the current through $R_1$ is alternately shunted by diodes 16 or 18 to turn the transistor 11 on and off and causes the voltage on DA to be an alternating voltage which alternates between +V and zero. The diodes 16 and 17 form an AND gate which applies the a.c. signal to the base only as long as an a.c. signal and the digit select signal are present. When the digit select signal is removed, no a.c. signal is applied to the base of transistor 11. The transistor is off applying full voltage +V to the line DA. However, a voltage which is the complement of the digit select voltage is applied to transistor 21 at terminal DA and serves to turn on the transistor 21 whereby the resistors 12 and 22 are connected in series between the source +V and ground 23. By suitably choosing the value of the resistors 12 and 22, a portion of the voltage +V appears on line DA as a d.c. offset voltage when the alternating d.c. voltage is not applied. Preferably, in accordance with the invention, the resistors are selected substantially equal whereby the voltage on the line DA is V/2.

A similar circuit is connected to like segments of each of the digits. The a.c. signal source 26 is at the same frequency as the source 13 but has a phase relationship which is 180° out of phase with the digit a.c. signal. The output of the a.c. source is applied through diodes 27 and 30 to the base of transistor 31 when segment select voltage pulses 28 are applied at terminal $S1_1$ through a diode 29 which, with diode 27, forms an AND gate. The transistor 31 serves to alternately apply voltage +V and zero to the line $S_1$. Therefore, by applying an a.c. signal during the pulse interval 28, an alternating voltage which alternates between zero and +V is applied to the line $S_1$. The complement of the pulse 28 is applied to a transistor 32 at terminal S1 whereby the transistor 32 is turned on when the segment select pulse is absent connecting the resistors 33 and 34 in series with their common terminals connected to the line $S_1$ whereby a portion of the voltage +V is applied to the line during absence of segment select pulses 28. Again, the resistors 33 and 34 are selected to be substantially equal whereby the voltage on the line $S_1$ during quiescent states is V/2.

Figure 3:
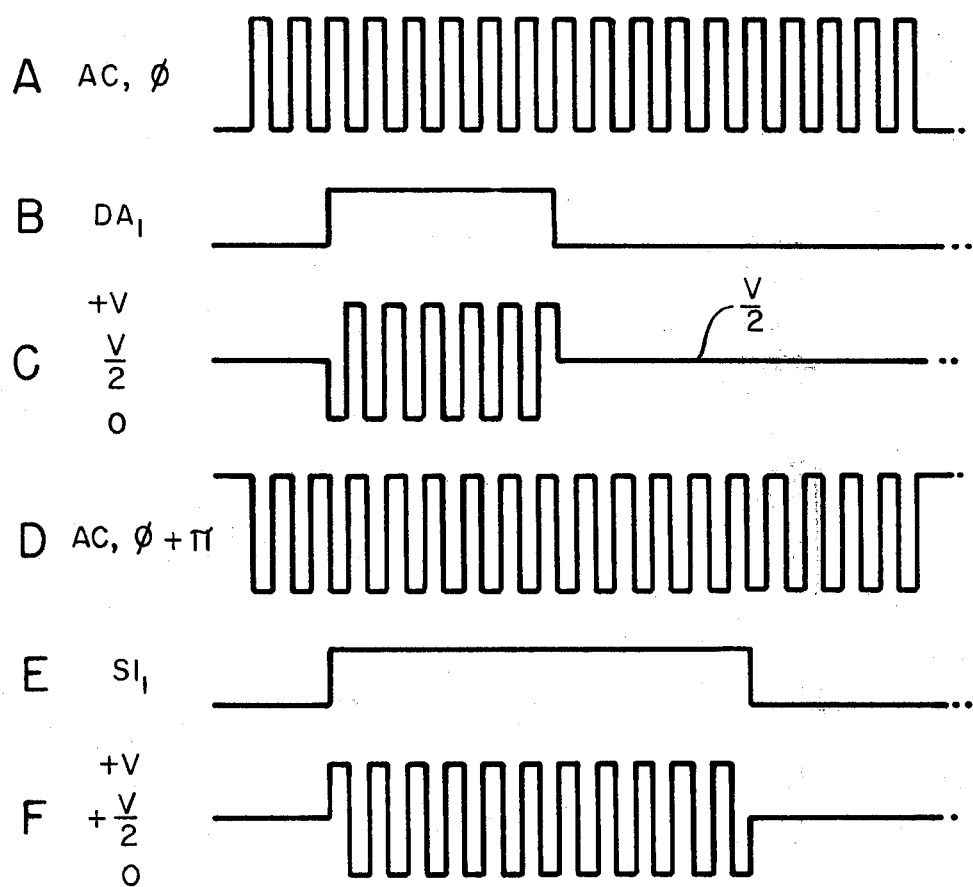
FIG. 3 shows the typical voltage waveforms applied to the segment lines and to the digit lines responsive to simultaneous application of segment and digit select pulses.

Operation of the circuit to apply voltages to particular segments and digits is schematically shown in FIG. 3. The output of the a.c. signal source 13 is shown in FIG. 3A and comprises an alternating squarewave voltage. A typical digit select pulse is shown in FIG. 3B. When the digit select pulse is present, the a.c. squarewave voltage is applied to the base of the transistor 11 and serves to turn on and off the transistor 11 to apply a voltage to the line DA which varies between zero and +V, FIG. 3C. The transistor 21 is turned off when the transistor 11 is on. As soon as the pulse DA terminates, the AND gate passes no further a.c. signal to the base of the transistor and transistor 11 is off. However, the complement of the digit select pulse is applied to the transistor 21 whereby the voltage on the line DA is V/2, FIG. 3C.

Similarly, the a.c. voltage from the source 26 is shown in FIG. 3D and a segment select pulse is shown in FIG. 3E. When the segment select pulse $S1_1$ is present, the a.c. voltage is allowed to drive the base of the transistor 31 and the voltage on the line $S_1$ varies between zero and +V. As soon as the select pulse terminates, the complement is applied to the transistor 32 turning it on and causing a voltage V/2 to be applied to the line $S_1$. It is to be noted that the voltages on the lines DA and $S_1$ are 180° out of phase. When voltages are present on both lines, an a.c. voltage is applied between the two terminals of the segment. More particularly, it is to be noted that when a voltage +V is applied to the digit line, zero voltage is applied to the selected segment line whereby a voltage +V appears across the segment. Alternatively, when the voltage is zero on the digit line, a positive voltage +V is present on the segment select line causing a voltage +V of opposite polarity to be applied across the segments. Thus, an a.c. voltage is applied across the segments. The characteristics of the segments are such that they are not energized unless a voltage of predetermined amplitude is applied across the same. In this regard, the voltage V/2 is selected whereby during the periods of time that pulses are not present, for example, when the digit pulse is not present and the segment pulses are still present, the voltage across the particular segment does not exceed the threshold value whereby the segment remains deenergized. Similarly, if segment pulses are not present, the digit pulses will not energize the segments.

Figure 4:
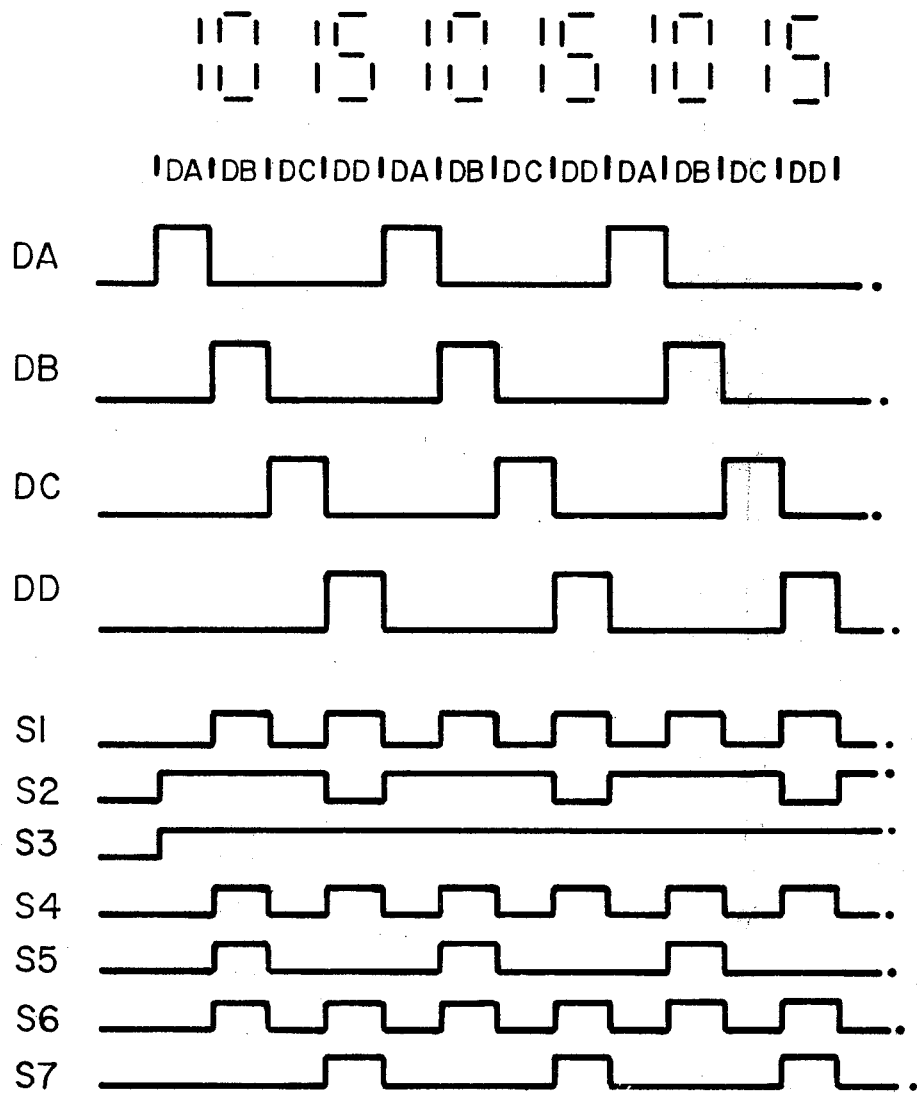
FIG. 4 shows the voltages applied to the segment and digit lines for displaying the numerals 1015.

Referring more particularly to FIG. 4, the output of typical digit multiplex logic, such as in a calculator or watch, is shown for controlling output on the digit lines DA, DB, DC and DD. The digit pulses are periodic pulses which appear sequentially on the input terminal $DA_1$ as shown and corresponding input terminal $DB_1$, $DC_1$ and $DD_1$ not shown. The pulses serve to turn on and off the digit transistors 11, 21 for each of the display digits as previously described.

Referring to the lower part of FIG. 4, the input segment drives for the segments $S_1$–$S_7$ are shown. The segment control pulses can be generated by a BCD to seven segment encoder. It may also include other logic for decimal points, etc. The particular segment drive pulses of all the digits are shown for displaying the number 1015. Thus, when digit select pulse $DA_1$ is present, a voltage will appear between lines $S_2$ and $S_3$ to illuminate the corresponding segments $S_{2,4}$ and $S_{3,4}$ and display the numeral 1, FIG. 1. A voltage appears between the lines DB and $S_1$, $S_2$, $S_3$, $S_4$, $S_5$ and $S_6$ when digit pulse $DB_1$ is present to illuminate the corresponding segments and display the numeral 0. At digit time DC, a voltage will appear between the lines DC and $S_2$, $S_3$ to display the numeral 1, and a voltage will appear between the lines DD and $S_1$, $S_3$, $S_4$, $S_6$ and $S_7$ at digit time DD to display the numeral 5. As the time changes, different voltage patterns are formed.

Thus, there has been provided a simple multiplex driver circuit for liquid crystal displays. It is apparent that other circuits can be used to provide the multiplexing shown and that the invention is not intended to be limited to the specific examples shown and described.

I claim:

1. A driver circuit for a liquid crystal display having a predetermined threshold voltage and adapted to be connected to a d.c. voltage source, first and second a.c. voltage sources having substantially 180° phase relationship, and a source of segment select pulses including a plurality of segment voltage control means, one for each segment of a numeral or symbol, one segment voltage control means connected to each of first terminals of like segments of a plurality of display numbers or symbols for controlling application of the d.c. voltage to said first terminals of like segments responsive to a segment select signal and said first a.c. voltage source to alternately apply said d.c. voltage to each of said first terminals, means responsive to the complement of the segment select pulses in the absence of segment select pulses to apply only a portion of said d.c. voltage to said first terminal of each of said like segments, said driver circuit also adapted to be connected to said second a.c. voltage source and a source of numeral or symbol select pulses, and also including a plurality of digit voltage control means one for each numeral or symbol, one digit voltage control means connected to second terminals of all segments in each one of said numerals or symbols for controlling application of voltage from said d.c. source to said second terminals responsive to a digit select pulse and said second a.c. voltage source to alternately apply said d.c. voltage to said plurality of second terminals, and means responsive to the complement of the digit select pulses in the absence of digit select pulses to apply only a portion of the d.c. voltage to said second terminals, whereby when the first and second terminals of a segment both have alternating d.c. voltage applied, the predetermined threshold of the segments is exceeded and the predetermined threshold of the segments is not exceeded when the alternating d.c. voltage is applied only to one or the other of said first and second terminals.

2. A driver circuit as in claim 1 wherein said segment voltage and digit voltage control means each include a switching transistor serving to alternately apply said d.c. voltage to the respective first and second terminals.

3. A driver circuit as in claim 2 wherein said segment voltage and digit voltage control means each include a second switching transistor connected in parallel with said first switching transistor to provide the response to absence of segment and digit select voltages to apply only a portion of said d.c. voltage to the respective terminals.

4. A driver circuit for liquid crystal displays including a d.c. voltage source, a first a.c. voltage source, a source of segment select pulses and a plurality of segment voltage control means, one for each segment of a numeral or symbol, one segment voltage control means connected to each of first terminals of like segments of a plurality of display numbers or symbols for controlling application of voltage from said d.c. source to said first terminals of like segments responsive to a segment select signal and the voltage from said first a.c. voltage source to alternately apply said d.c. voltage to said terminals, said control means being responsive to absence of segment select pulses to apply only a portion of said d.c. voltage to said first terminal of each of said like segments, a second a.c. voltage source having a 180° phase relationship to said first a.c. voltage source, a source of numeral or symbol select pulses and a plurality of digit voltage control means one for each numeral or symbol, one digit voltage control means connected to second terminals of all segments of each of said numerals or symbols for controlling application of voltage from said source to said second terminals responsive to a digit select pulse and to said second a.c. voltage source to alternately apply said d.c. voltage to said second terminals, and means responsive to the absence of digit select pulses to apply only a portion of the d.c. voltage to said segments, whereby when the first and second terminals of a segment both have alternating d.c. voltage applied, the segments are energized and said segments are not energized when the alternating d.c. voltage is applied only to one or the other of said first and second terminals.

* * * * *